(12) United States Patent
Falatok

(10) Patent No.: US 6,305,445 B1
(45) Date of Patent: Oct. 23, 2001

(54) STUMP GRINDING MACHINE HAVING IMPROVED CUTTING BOOM SUPPORT STRUCTURE

(75) Inventor: Daniel R. Falatok, Moore, SC (US)

(73) Assignee: BB&F Enterprises, LLC, Spartanburg, SC (US)

( * ) Notice: Subject to any disclaimer, the term of this patent is extended or adjusted under 35 U.S.C. 154(b) by 0 days.

(21) Appl. No.: 09/639,028

(22) Filed: Aug. 15, 2000

(51) Int. Cl.$^7$ ................................................. A01G 23/06
(52) U.S. Cl. .................. 144/24.12; 37/302; 144/334; 241/101.72; 414/694
(58) Field of Search ...................... 144/24.12, 34.1, 144/334, 335; 37/302, 304; 299/39.4, 78; 241/101.72; 414/694, 685

(56) References Cited

U.S. PATENT DOCUMENTS

| Re. 28,651 | 12/1975 | Welborn . | |
|---|---|---|---|
| 1,397,324 | 11/1921 | Moore . | |
| 3,198,224 | 8/1965 | Hiley | 144/24.12 |
| 3,308,860 | 3/1967 | De Shano . | |
| 3,664,645 | 5/1972 | Cobey . | |
| 3,818,957 | 6/1974 | Schoonover . | |
| 4,268,214 | * 5/1981 | Zeldman | 414/694 |
| 4,438,575 | * 3/1984 | Roe | 37/304 |
| 4,565,486 | 1/1986 | Crawford et al. . | |
| 4,583,908 | 4/1986 | Crawford . | |
| 4,709,736 | 12/1987 | Bellars | 144/24.12 |
| 4,823,852 | 4/1989 | Langford . | |
| 5,203,388 | 4/1993 | Bowling . | |
| 5,355,918 | 10/1994 | Lang | 144/24.12 |
| 5,431,349 | 7/1995 | Purser . | |
| 5,588,474 | 12/1996 | Egging . | |
| 5,660,217 | 8/1997 | Nissley . | |
| 5,823,238 | 10/1998 | Bohnke . | |
| 6,003,570 | 12/1999 | Falatok et al. . | |

OTHER PUBLICATIONS

Brochure entitled: "Levco HD 50 Stump Grinder: Your 'One–Man' Stump Removal System," published by Levco Manufacturers, Inc. of Wynne, Arkansas.

Brochure regarding Models 206, 630B, 665A and 2465 stump cutters, published by Vermeer Manufacturing Company of Pella, Iowa.

Brochure entitled: "Stump Cutters," published by J.P. Carlton Company Div. D.A.F., Inc. of Spartanburg, South Carolina.

Brochure regarding Rayco RG 1672 Diesel Stump Cutter, published by Rayco Mfg. Co. of Wooster, Ohio.

* cited by examiner

Primary Examiner—W. Donald Bray
(74) Attorney, Agent, or Firm—Nelson Mullins Riley & Scarborough

(57) ABSTRACT

An improved stump grinding machine includes a frame structure having an engine mounted thereon. A boom has a proximal end and distal end and is pivotally mounted to the frame structure at its proximal end. A grinding wheel is rotatably mounted to the distal end of the boom. A power train arrangement transmits power from the engine to the grinding wheel. The power train arrangement includes an idler shaft rotatably mounted on the frame structure. The boom is pivotally mounted to the frame structure independently of the idler shaft.

29 Claims, 7 Drawing Sheets

STUMP GRINDING MACHINE HAVING IMPROVED CUTTING BOOM SUPPORT STRUCTURE

BACKGROUND OF THE INVENTION

The present invention relates generally to stump grinding machines of the type having a grinding wheel located at the distal end of a movable boom. More particularly, the invention relates to a stump grinding machine incorporating a novel support structure for pivotally mounting the boom to the machine's frame.

Stump grinding machines are widely used to remove tree stumps. These machines are constructed having a grinding wheel located at the distal end of a movable boom. Typically, the grinding wheel is swept back and forth in a generally horizontal plane across the tree stump. With each sweep, the grinding wheel is lowered slightly to remove more of the stump. The final sweeps of the grinding wheel may be below ground level to ensure elimination of the entire stump.

Often, stump grinding machines have a wheeled frame structure to facilitate movement of the machine from place to place. The frame may be self-propelled or configured for towing behind a separate vehicle. An engine, typically a gasoline or diesel engine, located on the wheeled frame generates power to drive the grinding wheel.

The grinding wheel generally receives power from the engine through a series of belts. In one known arrangement, a first belt connects the engine output to a rotatable idler shaft. A second belt is connected between the idler shaft and the grinding wheel. The idler shaft thus rotates at very high speeds to transmit power to the grinding wheel.

In addition to facilitating the transmittal of power from the engine to the grinding wheel, the idler shaft serves to pivotally support the machine's boom. To allow the idler shaft to rotate, the boom is mounted about the rotating idler shaft by bearings. Such an arrangement is disclosed in U.S. Pat. No. 6,003,570 entitled "Stump Grinder Machine Having Turntable Mounted Engine Arrangement," incorporated herein by reference.

Arrangements utilizing an idler shaft to transmit power to the cutting wheel have worked generally well for their intended purpose. It has been found, however, that vibrations generated at the stump grinding wheel may be transmitted to the bearings used to support the boom on the idler shaft. The combination of vibration and the rotational speed of the bearings' inner race gives rise to various maintenance considerations.

SUMMARY OF THE INVENTION

The present invention recognizes and addresses the foregoing considerations, and others, of prior art constructions and methods. Accordingly, it is an object of the present invention to provide a novel stump grinding machine.

It is a further object of the present invention to provide a stump grinding machine having a novel support structure for pivotally mounting the boom to the machine's frame.

It is a more particular object of the present invention to provide a novel support structure for pivotally mounting the boom to the machine's frame which isolates rotation of the idler shaft from the pivoting motion of the boom.

Some of these objects are achieved by a stump cutting apparatus including a frame structure supported by at least one wheel to facilitate movement of the stump cutting apparatus from place to place. An engine is supported by the frame structure. A boom having a proximal end and a distal end is pivotally mounted to the frame structure at its proximal end. A grinding wheel is rotatably mounted to the distal end of the boom.

The stump cutting apparatus further includes a power train arrangement for transmitting power from the engine to the grinding wheel. The power train arrangement includes an idler shaft mounted on the frame structure for rotation so as to be coaxial with the pivot axis of the boom. The boom is pivotally mounted to the frame structure independently of the idler shaft.

In some exemplary embodiments, a boom tube fixed to the proximal end of the boom surrounds the idler shaft. Additionally, the boom tube may be supported by at least one bearing. For example, the boom tube may be supported by two bearings. In some exemplary embodiments, the idler shaft may be rotatably supported by two bearings coaxial with a pivot axis of the boom. Additionally, the boom bearings may be located between the idler shaft bearings.

Preferably, the power train arrangement includes a first belt stage transmitting power between the engine and the idler shaft and a second belt stage transmitting power between the idler shaft and the grinding wheel. The first belt stage may include an engine pulley wheel, a first idler shaft pulley wheel fixed to the idler shaft and coaxial with the pivot axis of the boom, and a first belt transmitting power between the engine pulley wheel and the first idler shaft pulley wheel. The second belt stage may include a second idler shaft pulley wheel coaxial with the pivot axis of the boom fixed to the idler shaft, a grinding wheel pulley wheel, and a second belt transmitting power between the second idler shaft pulley wheel and the grinding wheel pulley wheel. In addition, the bearings supporting the idler shaft and the boom may be located between the first and second belt stages.

In some exemplary embodiments, the frame structure includes a turntable assembly mounted for rotational movement in a first plane. The boom may be pivotally mounted on the turntable assembly for movement in a second plane generally perpendicular to the first plane.

In some preferred embodiments, the engine is gasoline powered and the bearings for mounting the boom and idler shaft to the frame structure are tapered roller bearings. Additionally, the first belt stage may include a multiple v-belt and the second belt stage may include a poly-chain.

Other objects of the invention are achieved by stump cutting apparatus including a frame structure supporting an engine. The engine includes an engine pulley wheel rotationally driven by the engine. A boom having a proximal end and a distal end includes a boom tube pivotally mounted to the frame structure by at least one first bearing. A grinding wheel is mounted for rotation to a grinding wheel shaft at the distal end of the boom. An idler shaft, extending through the boom tube, is rotatably mounted to the frame by a plurality of second bearings.

The apparatus further includes a power train arrangement for transmitting power from the engine to the idler shaft and from the idler shaft to the grinding shaft pulley wheel to rotationally drive the grinding wheel. In some exemplary embodiments, the idler shaft is mounted to the frame by two outer bearings that are coaxial with a pivot axis of the boom.

Other objects of the invention are achieved by a mounting arrangement having a frame. A pivoting boom structure having a proximal end and a distal end is pivotally mounted to the frame by at least one first bearing at its proximal end. A first shaft is rotatably mounted to the frame and is coaxial with a pivot axis of the boom structure. The first shaft is mounted to the frame by a plurality of second bearings. A tool is rotatably mounted about a drive shaft at the distal end of the boom structure. A power train arrangement transmits power from the first shaft to the tool, with the boom structure being pivotally mounted to the frame independently of the first shaft.

In some exemplary embodiments, a boom tube is fixed to the proximal end of the boom structure and is pivotally mounted to the frame by at least one first bearing so that it surrounds the first shaft. In another preferred embodiment, the at least one first bearing includes two bearings.

The accompanying drawings, which are incorporated in and constitute a part of the specification, illustrate one or more embodiments of the invention and, together with the description, serve to explain the principles of the invention.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
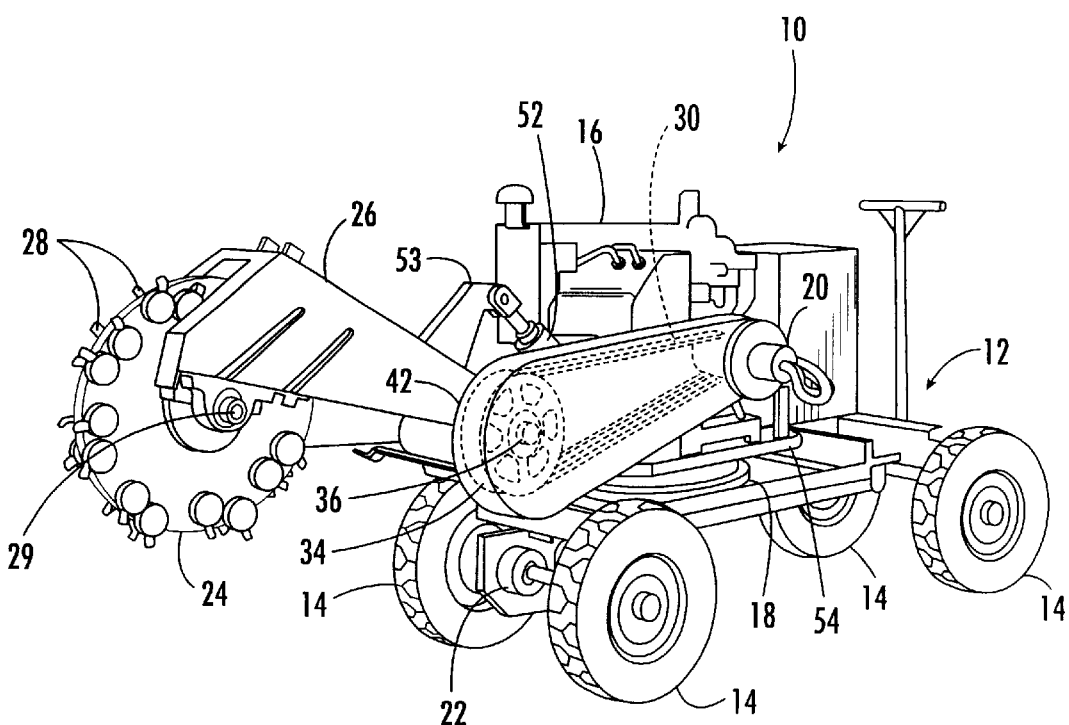
FIG. 1 is a perspective view of a stump grinding machine constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting the broader aspects of the present invention, which broader aspects are embodied in the exemplary constructions.

FIG. 1 illustrates an improved stump grinder machine 10 constructed in accordance with the present invention. As shown, machine 10 includes a frame structure 12 supported by a plurality of wheels 14 to facilitate movement of the machine from place to place. An engine 16 is mounted on a turntable assembly 18 for rotational movement through a predetermined horizontal arc.

Typically, machine 10 will include a hydraulic system to power the various fluid-actuated cylinders and the like. A hydraulic pump 20 connected to an output shaft 21 (FIG. 2) of engine 16 supplies power to the hydraulic system.

In the illustrated embodiment, machine 10 is a self-propelled device driven by a hydraulic motor 22 operatively connected to hydraulic pump 20. It should be distinctly understood, however, that the present invention includes towed stump grinding machines as well as stump grinding machines powered by other suitable methods.

A grinding wheel 24 located at the distal end of a boom 26 performs the stump grinding operation. As shown, grinding wheel 24 has a plurality of radial teeth, such as teeth 28, that grind the stump as the rotating grinding wheel moves across it.

Figure 2:
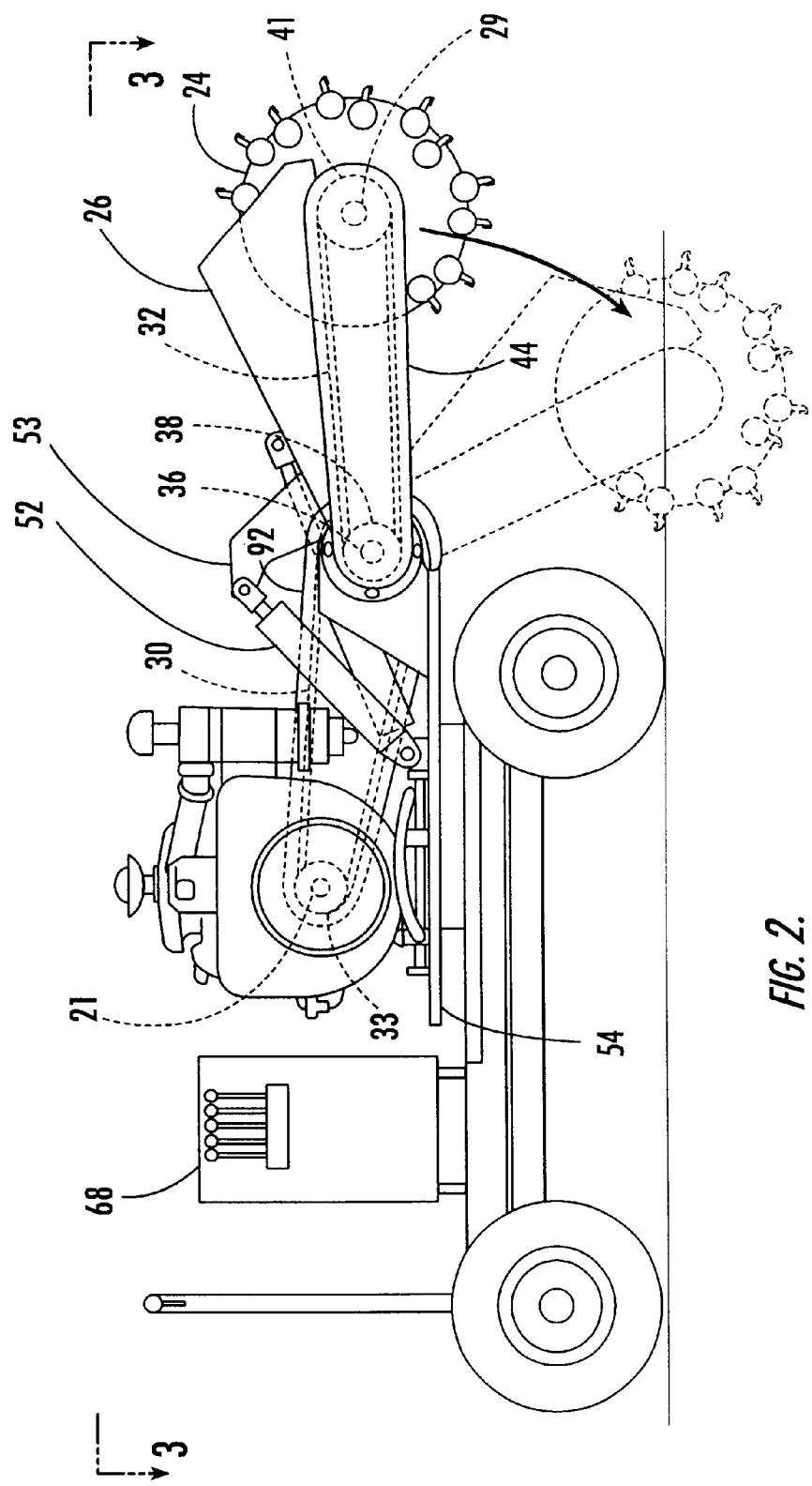
FIG. 2 is a side elevation of the stump grinding machine of FIG. 1 showing the pivotal movement of the cutting boom structure.

Referring also to FIG. 2, grinding wheel 24 is rotatably driven by successive belt stages 30 and 32 configured between output shaft 21 and a drive shaft 29 of the grinding wheel. In the illustrated embodiment, belt stage 30 comprises a multiple v-belt stage extending from a pulley 33 on the engine's output shaft 21 to a pulley 34 mounted at one end of an idler shaft 36.

Figure 3:
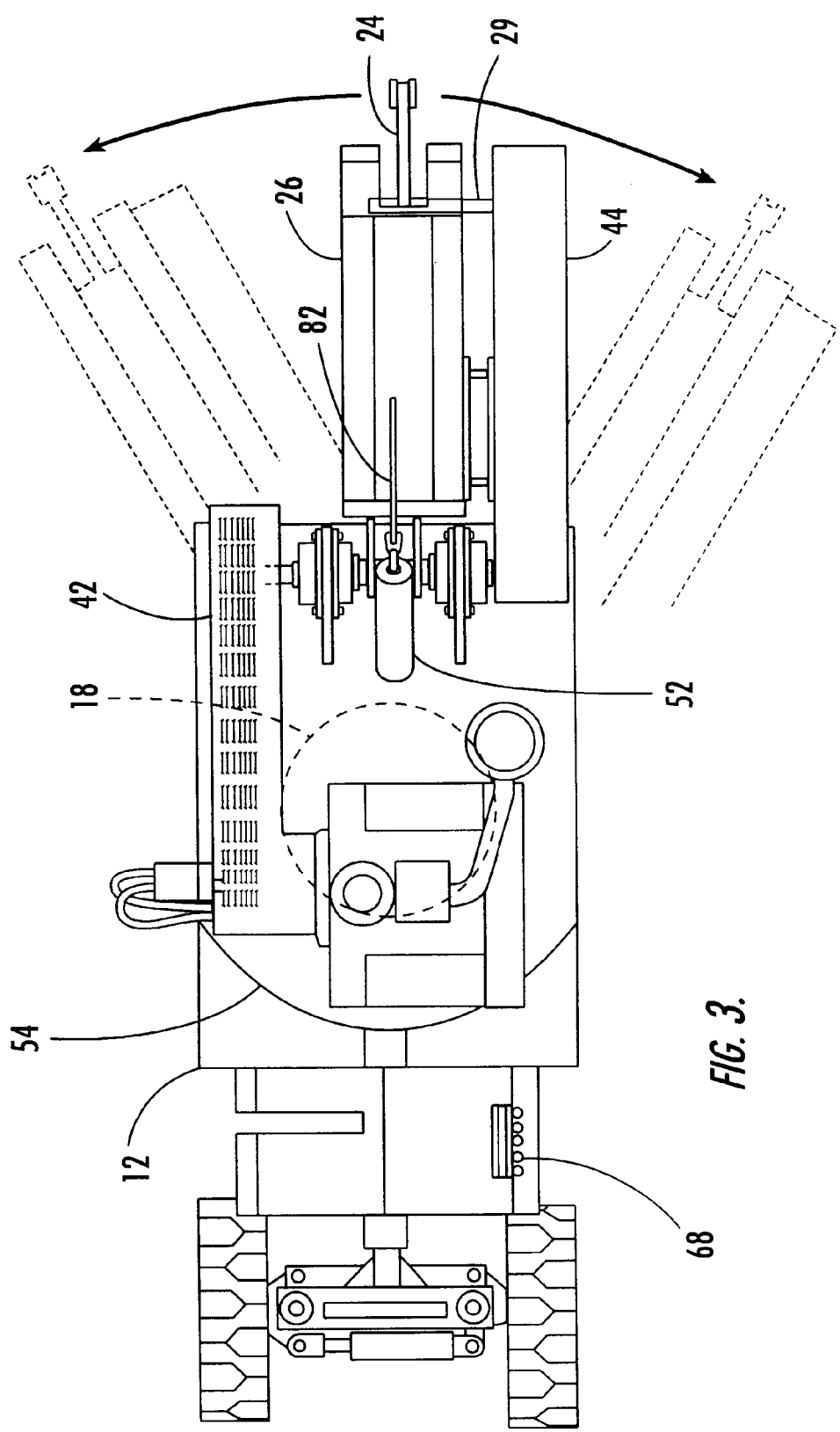
FIG. 3 is a plan view as taken along line 3—3 of FIG. 2 illustrating the horizontal sweep of the turntable assembly and the boom structure carried thereby.

As shown in FIG. 2, belt stage 32, which may include a poly-chain, is then driven from another pulley 38 located on the opposite end of idler shaft 36. A grinding wheel pulley 41 is attached to the end of the grinding wheel's drive shaft 29. As shown in FIGS. 2 and 3, belt stages 30 and 32 may be located inside of respective belt guards 42 and 44.

Figure 4:
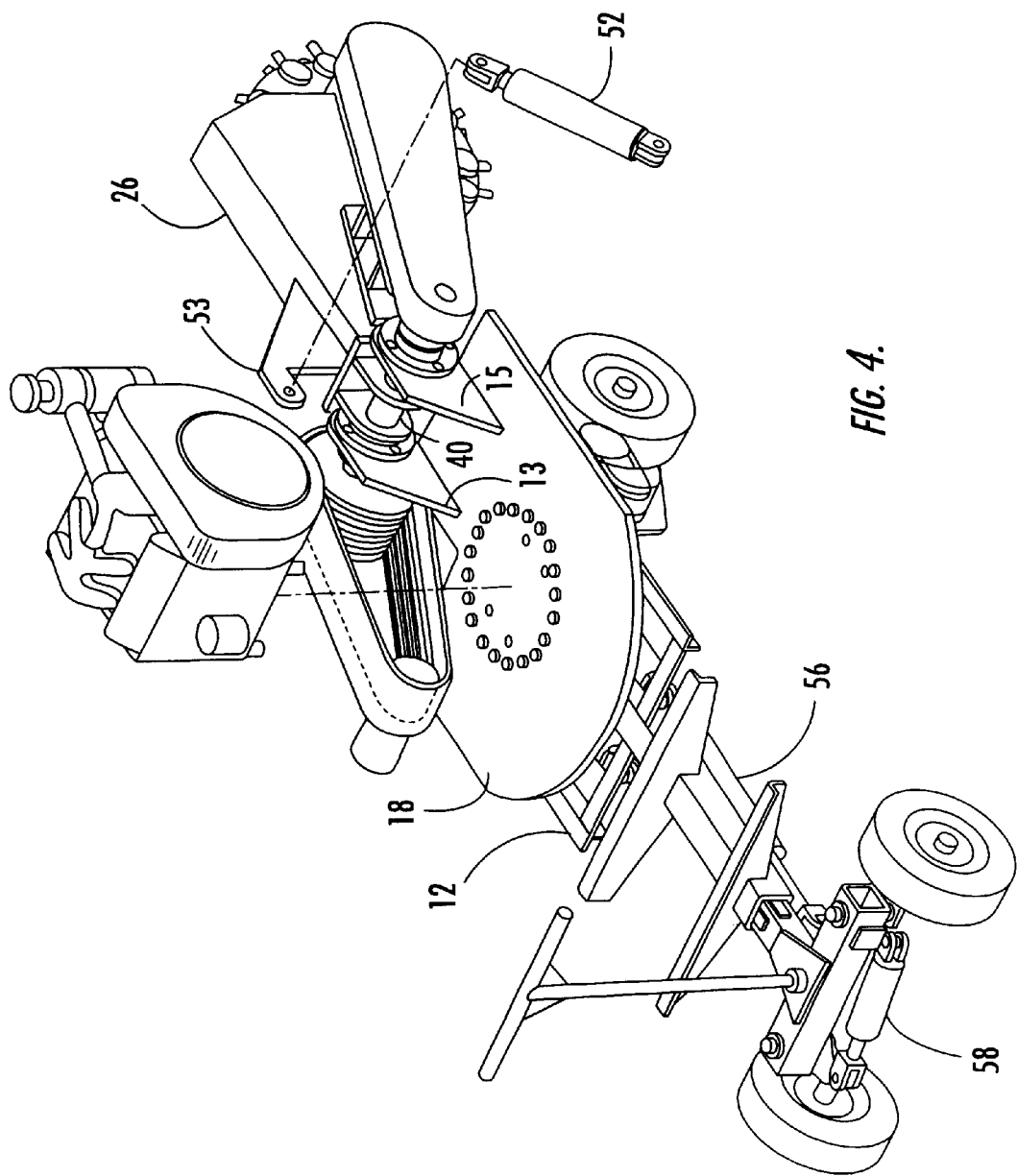
FIG. 4 is a partially exploded view showing components of the stump grinding machine of FIG. 1.

As can be seen in FIG. 4, a boom tube 40 is pivotally mounted to turntable assembly 18 at flange supports 13 and 15. Frame structure 12 may comprise a generally flat bearing support (not shown) on which turntable assembly 18 is mounted.

A hydraulic cylinder 52, having one end pivotally connected to turntable assembly 18 and the opposite end connected to an upstanding connection member 53, may be utilized to pivot boom 26 in a generally vertical plane as shown in FIG. 2.

Additionally, a hydraulic cylinder 56 may be utilized to expand the size of frame 12 for greater stability during the cutting operation. As shown in FIG. 4, portions of frame structure 12 may be telescopically configured to permit such expansion. Steering of this self-propelled machine is also preferably accomplished hydraulically, such as by a steering cylinder 58.

Power generated from engine 16 may also be used to sweep grinding wheel 24 in a horizontal plane as shown in FIG. 3. Specifically, rotation of turntable assembly 18 causes the grinding wheel to sweep in a horizontal plane.

As is typical, the hydraulic system or other method of controlling the location of grinding wheel 24 may have multiple control levers, as indicated at 68 in FIGS. 2 and 3. Thus, an operator can use the controls at 68 to rotate turntable assembly 18 with respect to frame 12, thereby pivoting grinding wheel 24 in a horizontal plane. Additionally, the operator can actuate hydraulic cylinder 52 to pivot boom 26 in a generally vertical plane enabling grinding wheel 24 to gradually grind a stump below the surface of the ground.

Figure 5:
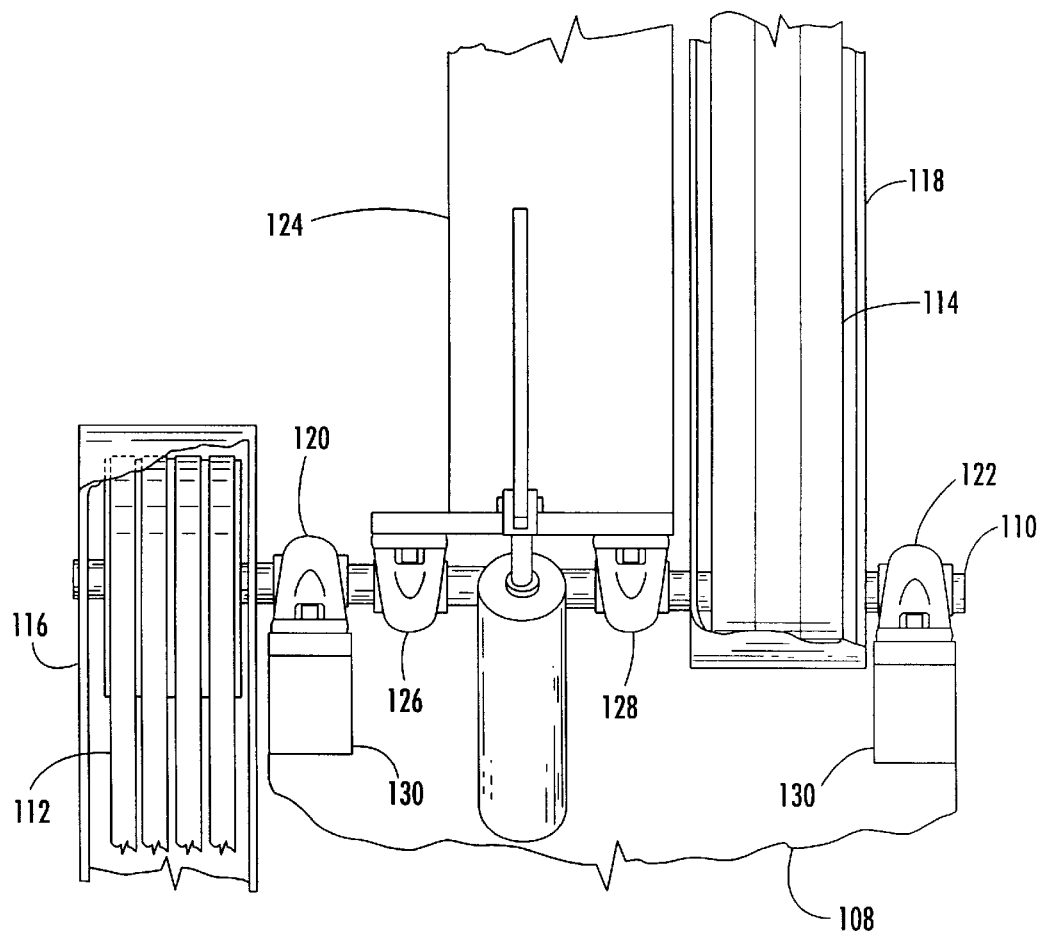
FIG. 5 is an enlarged fragmentary view from above of a boom mounting arrangement in accordance with the prior art.

Before discussing various aspects of the present invention in further detail, it is helpful to review certain prior art. In this regard, FIG. 5 illustrates a boom-to-frame mounting arrangement in accordance with the prior art. As shown, the prior art machine includes a frame 108. An idler shaft 110 is connected to engine driven first belt 112 and a grinding wheel second belt 114, each of which is housed respectively within belt guards 116 and 118. Idler shaft 110 is mounted to frame 108 by pillow block bearings 120 and 122 mounted to upstanding supports 130. A boom 124 is pivotally mounted to the idler shaft by pillow block bearings 126 and 128.

As known to those of ordinary skill in the art, a typical bearing arrangement includes a housing, an inner race, an outer race, and a plurality of rolling elements disposed between the inner and outer races. Thus, in the prior art stump grinder boom mounting arrangement illustrated in FIG. 5, the inner race of all four bearings 120, 122, 126, and 128 is configured to rotate with idler shaft 110.

Figure 6:
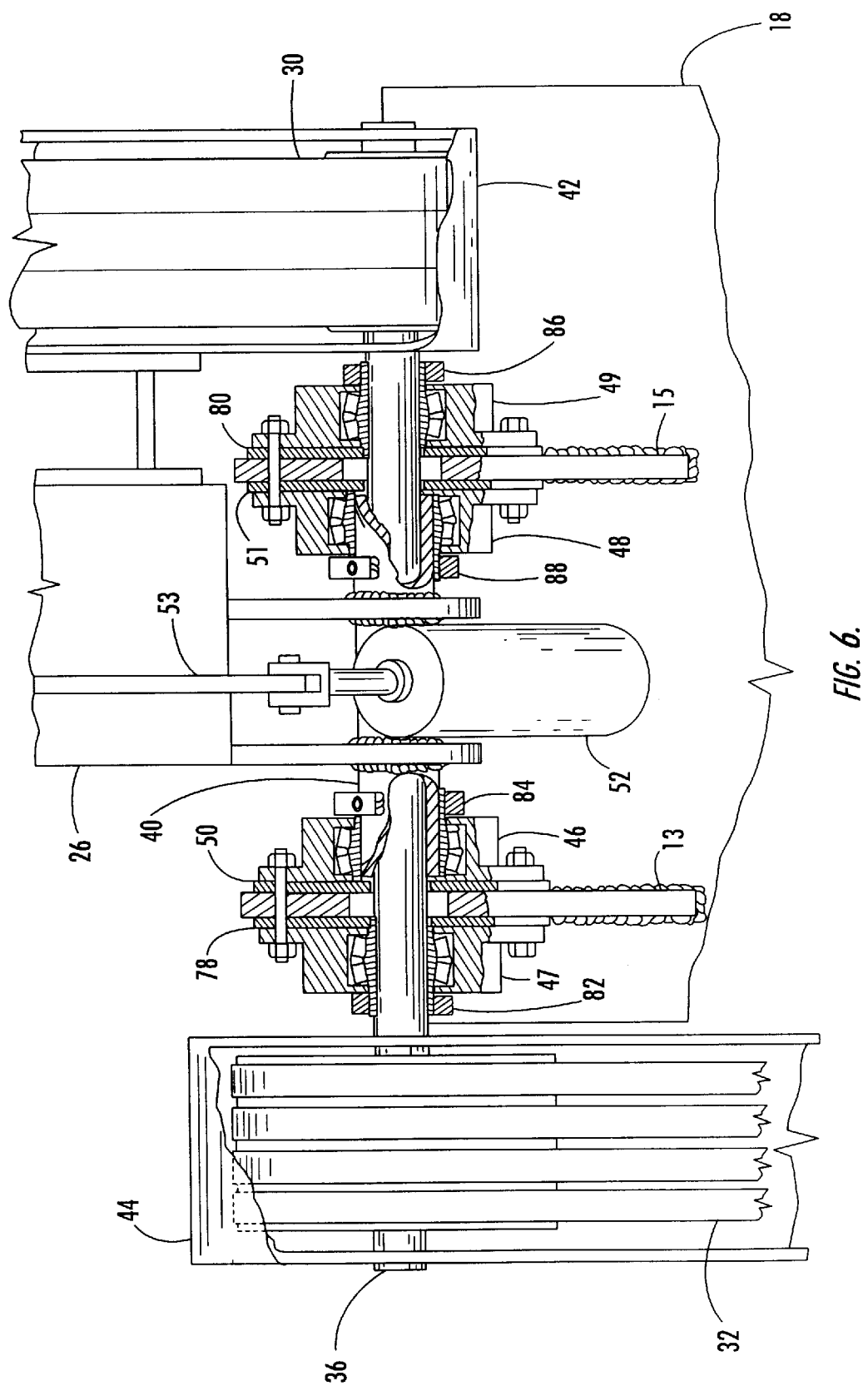
FIG. 6 is an enlarged fragmentary view from above of a mounting arrangement in accordance with the present invention, with certain components shown in section.

Now that certain prior art has been discussed in greater detail, reference is made to FIG. 6 for further discussion of the present invention. As illustrated, boom 26 is mounted about idler shaft 36 in a manner that permits the idler shaft to freely rotate with respect to the boom and frame structure 12. A boom tube 40 is coaxial with a pivot axis of boom 26, which corresponds with a rotational axis of idler shaft 36. As mentioned above, boom tube 40 is pivotally mounted to the frame structure on turntable 18 at flange supports 13 and 15 by respective inner bearings 46 and 48, which in one preferred embodiment include bearings of approximately three inches in size. Boom tube 40 is fixed to boom 26 such as by welding.

Figure 7:
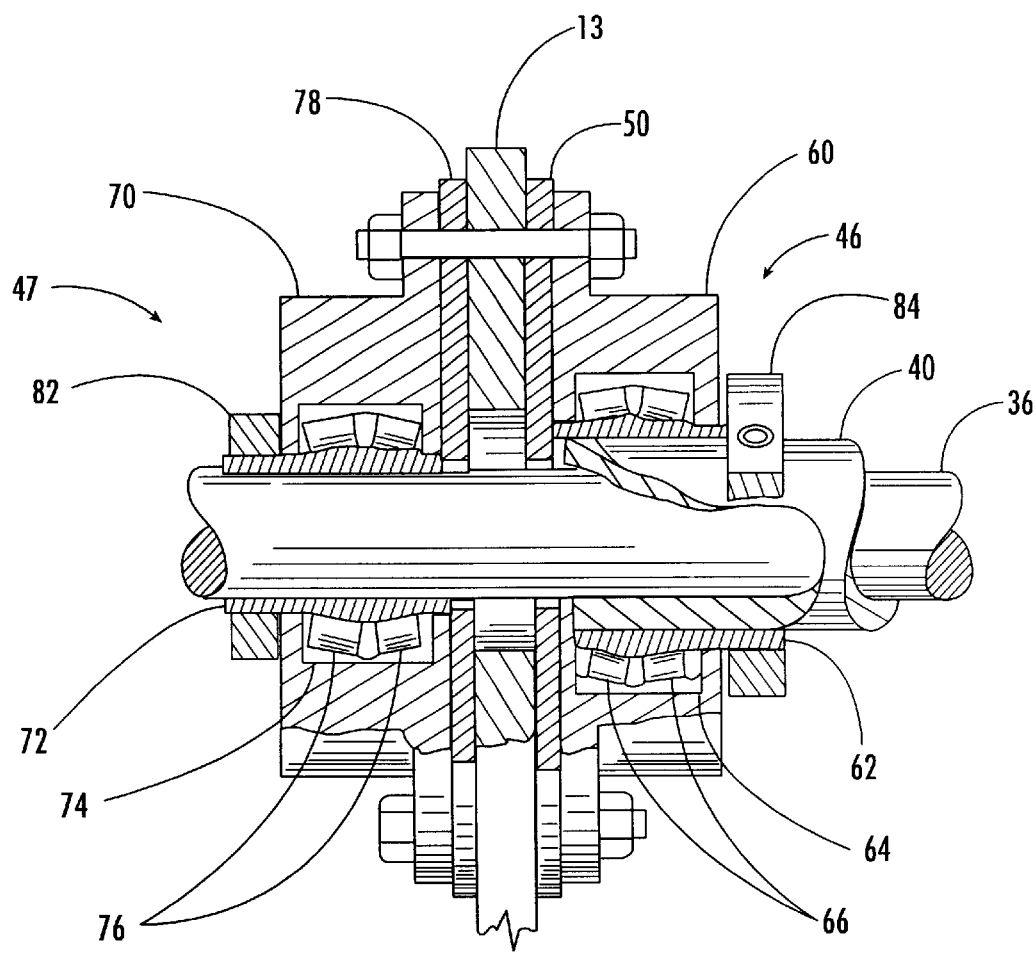
FIG. 7 is an enlarged partial cross-sectional view of a portion of the arrangement shown in FIG. 6.

Referring now also to FIG. 7, inner bearing 46 includes a housing 60, an inner race 62, an outer race 64, and a plurality of rolling elements 66 disposed between the inner and outer races. Inner bearing 48 is similarly configured. As illustrated, inner bearing spacers 50 and 51 may be provided between inner bearings 46 and 48 and respective flange supports 13 and 15. It should also be understood that even though the illustrated embodiments show a nut and bolt fastening the bearings to their respective flange supports, any suitable fastening mechanism could be employed for this purpose.

Idler shaft 36 is rotatably supported by a plurality of outer bearings, for example outer bearings 47 and 49, respectively, mounted to frame structure 12 at flange supports 13 and 15. In one preferred embodiment, outer bearings 47 and 49 are approximately 1¾ inches in size. As should be understood, the size of the inner and outer bearings will vary according to the diameter of the respective boom tube or shaft to which they are attached.

Referring specifically to FIG. 7, outer bearing 47 includes a housing 70, an inner race 72, an outer race 74, and a plurality of rolling elements 76 disposed between the inner and outer races. Outer bearing 49, illustrated in FIG. 6, is similarly configured. As shown, outer bearings 47 and 49 are separated from respective flange supports 13 and 15 by a pair of outer bearing spacers 78 and 80.

As shown in FIG. 7, a set collar 82 mounted about idler shaft 36 connects inner race 72 to idler shaft 36. A second set collar 84 mounted about boom tube 40 connects inner race 62 to the boom tube. Referring also to FIG. 6, set collars 86 and 88 are similarly configured to mount the inner races of bearings 49 and 48 respectively to idler shaft 36 and boom tube 40.

Since the inner races of the inner bearings rotate independently of the inner races of the outer bearings, the novel construction of the present invention isolates rotation of idler shaft 36 from the pivoting action of boom 26. Additionally, idler shaft 36 does not support the weight of boom 26 and cutting wheel 24.

It can thus be seen that the present invention provides a novel stump grinding apparatus in furtherance of the noted objects. While preferred embodiments of the invention have been shown and described, modifications and variations thereto may be practiced by those of ordinary skill in the art without departing from the spirit and scope of the present invention, which is more particularly set forth in the appended claims. In addition, it should be understood that aspects of the various embodiments may be interchanged both in whole or in part. Furthermore those of ordinary skill in the art will appreciate that the foregoing description is by way of example only, and is not intended as a limitation of the invention so further described in such appended claims.

What is claimed is:

1. A stump grinding apparatus, said apparatus comprising:
   a frame structure supported by at least one wheel to facilitate movement of said stump grinding apparatus from place to place;
   an engine supported by said frame structure;
   a boom having a proximal end and a distal end, said boom being pivotally mounted to said frame structure at said proximal end thereof;
   a grinding wheel rotatably mounted to said distal end of said boom; and
   a power train arrangement for transmitting power from said engine to said grinding wheel, said power train arrangement including an idler shaft mounted on said frame structure for rotation so as to be coaxial with a pivot axis of said boom,
   wherein said boom is pivotally mounted to said frame structure independently of said idler shaft.

2. The stump grinding apparatus of claim 1, including a boom tube pivotally mounted to said frame structure and surrounding said idler shaft, said proximal end of said boom being fixed to said boom tube.

3. The stump grinding apparatus of claim 2, wherein said boom tube is pivotally supported by at least one first bearing.

4. The stump grinding apparatus of claim 3, wherein said at least one first bearing includes two bearings.

5. The stump grinding apparatus of claim 3, wherein said idler shaft is supported for rotation by a plurality of second bearings.

6. The stump grinding apparatus of claim 5, wherein said plurality of second bearings includes two outer bearings coaxial with said boom pivot axis, wherein said at least one first bearing includes two inner bearings coaxial with said boom pivot axis, and wherein said inner bearings are located between said outer bearings.

7. The stump grinding apparatus of claim 1, wherein said power train arrangement includes a first belt stage transmitting power between said engine and said idler shaft and a second belt stage transmitting power between said idler shaft and said grinding wheel.

8. The stump grinding apparatus of claim 7, wherein said first belt stage includes an engine pulley wheel, a first idler shaft pulley wheel fixed to said idler shaft and coaxial with said boom pivot axis, and a first belt transmitting power between said engine pulley wheel and said first idler shaft pulley wheel.

9. The stump grinding apparatus of claim 7, wherein said second belt stage includes a second idler shaft pulley wheel fixed to said idler shaft and coaxial with said boom pivot axis, a drive shaft pulley wheel coaxial with a rotational axis of said grinding wheel, and a second belt transmitting power between said idler shaft second pulley wheel and said drive shaft pulley wheel.

10. The stump grinding apparatus of claim 5, wherein said power train assembly includes a first belt stage transmitting power between said engine and said idler shaft and a second belt stage transmitting power between said idler shaft and said grinding wheel, and wherein said at least one first bearing and said plurality of second bearings are located between said first belt stage and said second belt stage.

11. The stump grinding apparatus of claim 1, including a turntable assembly mounted to said frame structure for rotational movement in a first plane with respect to said frame structure.

12. The stump grinding apparatus of claim 11, wherein said engine and said boom are mounted to said turntable assembly.

13. The stump grinding apparatus of claim 11, wherein said boom is pivotally mounted on said turntable assembly for movement in a second plane that is generally perpendicular to said first plane.

14. The stump grinding apparatus of claim 6, wherein said plurality of second bearings includes a plurality of tapered roller bearings, and wherein said at least one first bearing includes at least one tapered roller bearing.

15. The stump grinding apparatus of claim 8, wherein said first belt stage includes a multiple v-belt and said second belt stage includes a poly-chain.

16. A stump grinding apparatus, said apparatus comprising:
   a frame structure;
   an engine supported by said frame structure;
   a boom having a proximal end and a distal end, said proximal end including a boom tube pivotally mounted to said frame structure by at least one first bearing so that said boom is pivotally mounted to said frame structure;
   a grinding wheel rotatably mounted to said distal end of said boom;
   an idler shaft extending through said boom tube and mounted for rotation on said frame structure by a plurality of second bearings; and
   a power train arrangement for transmitting power from said engine to said idler shaft and from said idler shaft to said grinding wheel.

17. The stump grinding apparatus of claim 16, wherein said power train arrangement includes:
   a first belt stage transmitting power from an engine pulley wheel connected to said engine to a first idler shaft pulley wheel fixed to said idler shaft to rotationally drive said idler shaft; and
   a second belt stage transmitting power from a second idler shaft pulley wheel fixed to said idler shaft to a drive shaft pulley wheel to rotationally drive said grinding wheel.

18. The stump grinding apparatus of claim 16, wherein said plurality of second bearings includes two outer bearings coaxial with said boom pivot axis, wherein said at least one first bearing includes two inner bearings coaxial with said boom pivot axis, and wherein said inner bearings are located between said outer bearings.

19. The stump grinding apparatus of claim 16, including
   a turntable assembly mounted to said frame structure for rotational movement in a first plane with respect to said frame structure; and
   means for rotating said turntable assembly with respect to said frame structure,
   wherein said engine and said boom are mounted to said turntable assembly.

20. The stump grinding apparatus of claim 19, wherein said boom is pivotally mounted on said turntable assembly for movement in a second plane that is generally perpendicular to said first plane.

21. A mounting arrangement comprising:
   a frame;
   a pivoting boom structure having a proximal end and a distal end, said proximal end being pivotally mounted to said frame by at least one first bearing;
   a first shaft rotatably mounted on said frame so as to be coaxial with a pivot axis of said boom structure, said first shaft being mounted to said frame by a plurality of second bearings;
   a tool rotatably mounted to said distal end of said boom structure; and
   a power train arrangement for transmitting power from said first shaft to said tool,
   wherein said boom structure is pivotally mounted to said frame independently of said first shaft.

22. The mounting arrangement of claim 21, including
   a boom tube fixed to said proximal end of said boom structure and pivotally mounted to said at least one support member by said at least one first bearing so that said boom tube surrounds said first shaft.

23. The mounting arrangement of claim 21, wherein said at least one first bearing includes two bearings.

24. The mounting arrangement of claim 21, wherein said plurality of second bearings includes two outer bearings coaxial with said boom structure pivot axis, wherein said at least one first bearing includes two inner bearings coaxial with said boom structure pivot axis, and wherein said inner bearings are located between said outer bearings.

25. The mounting arrangement of claim 21, wherein said power train arrangement includes a first belt stage transmitting power between an engine and said first shaft, and a second belt stage transmitting power between said first shaft and said drive shaft.

26. The mounting arrangement of claim 25, wherein said first belt stage includes an engine pulley wheel, a first shaft first pulley wheel fixed to said first shaft and coaxial with said boom structure pivot axis, and a first belt transmitting power between said engine pulley wheel and said first shaft first pulley wheel.

27. The mounting arrangement of claim 25, wherein said second belt stage includes a first shaft second pulley wheel fixed to said first shaft and coaxial with said boom structure pivot axis, a drive shaft pulley wheel coaxial with a rotational axis of said drive shaft, and a second belt transmitting power between said first shaft second pulley wheel and said drive shaft pulley wheel.

28. The mounting arrangement of claim 21, wherein said plurality of second bearings includes a plurality of tapered roller bearings, and wherein said at least one first bearing includes at least one tapered roller bearing.

29. The mounting arrangement of claim 25, wherein said first belt stage includes a multiple v-belt and said second belt stage includes a poly-chain.

\* \* \* \* \*